April 5, 1955
C. WOLF
2,705,512
SAW CHAIN
Filed Jan. 3, 1950
4 Sheets-Sheet 1
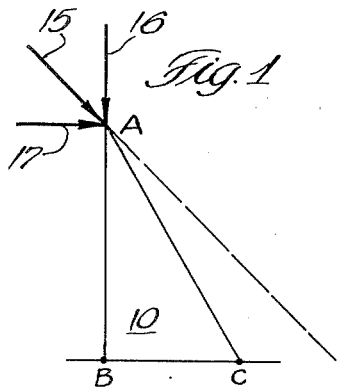
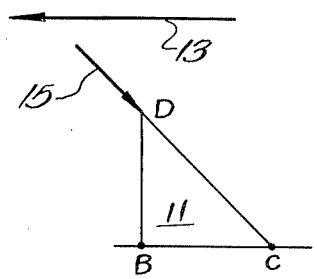
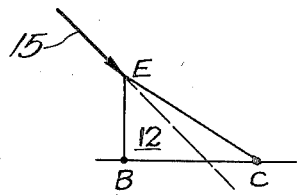
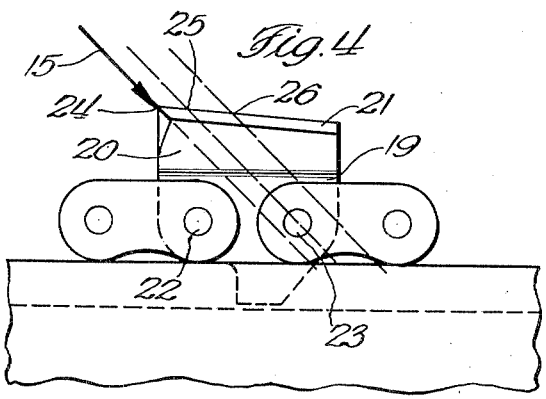
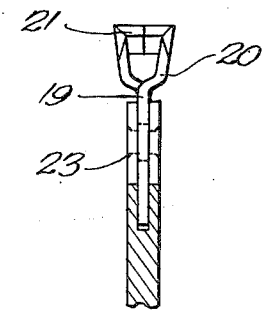
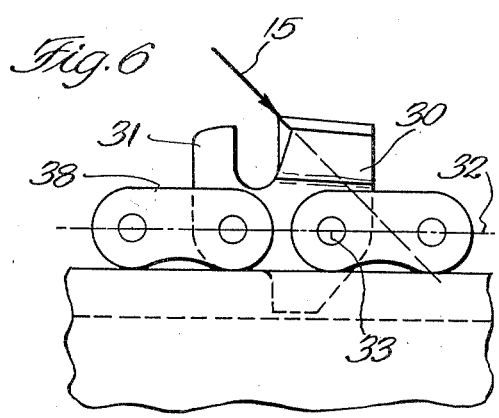
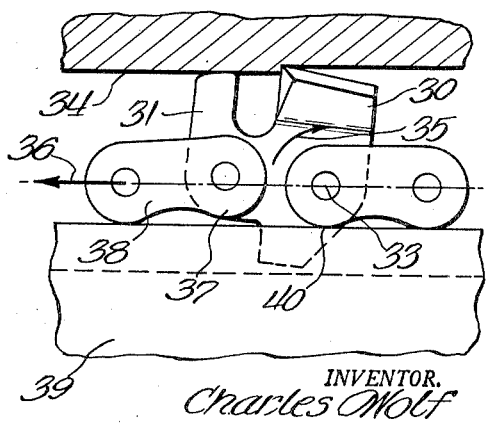
INVENTOR.
Charles Wolf
BY
Buckhorn and Cheatham
ATTORNEYS April 5, 1955  C. WOLF  2,705,512
SAW CHAIN
Filed Jan. 3, 1950  4 Sheets-Sheet 2
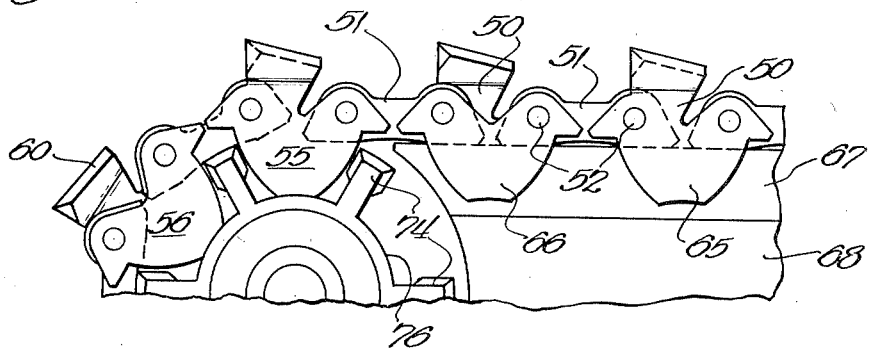
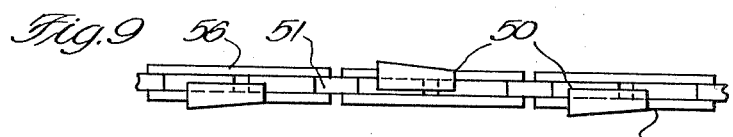
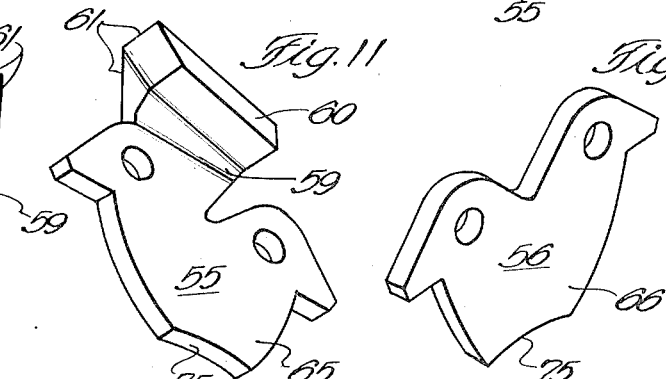
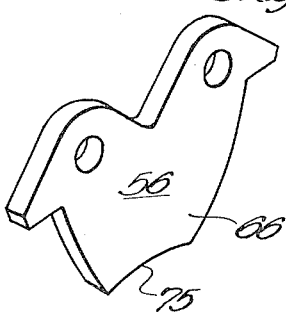
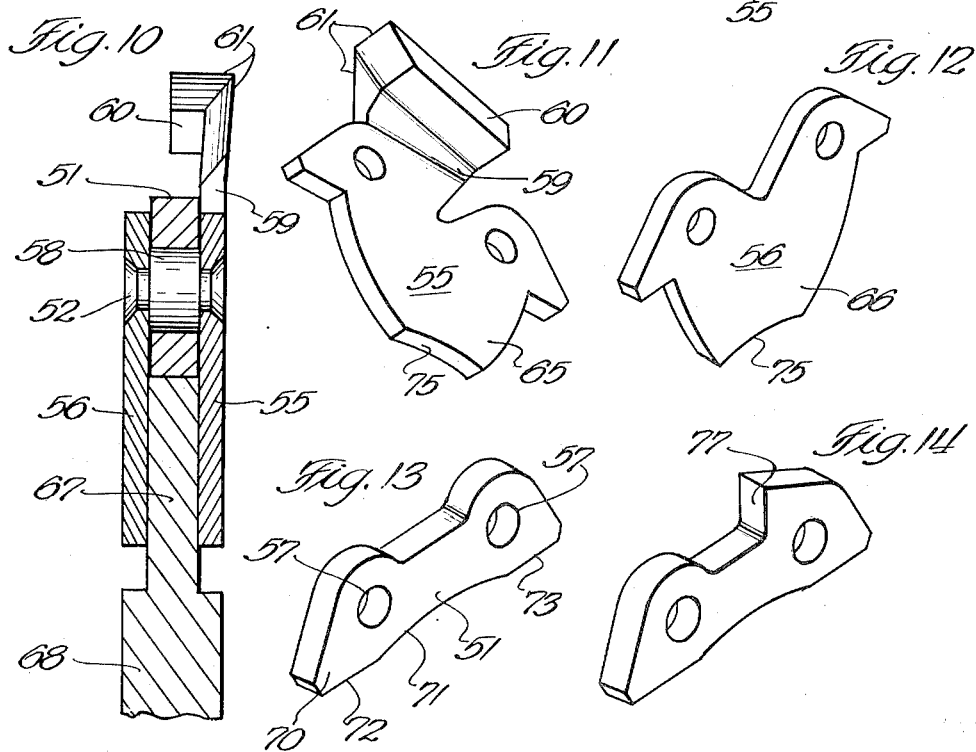
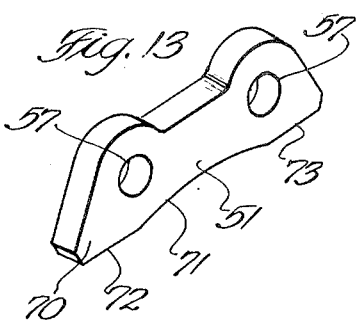
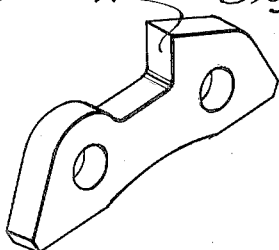
INVENTOR.
Charles Wolf
BY
ATTORNEYS

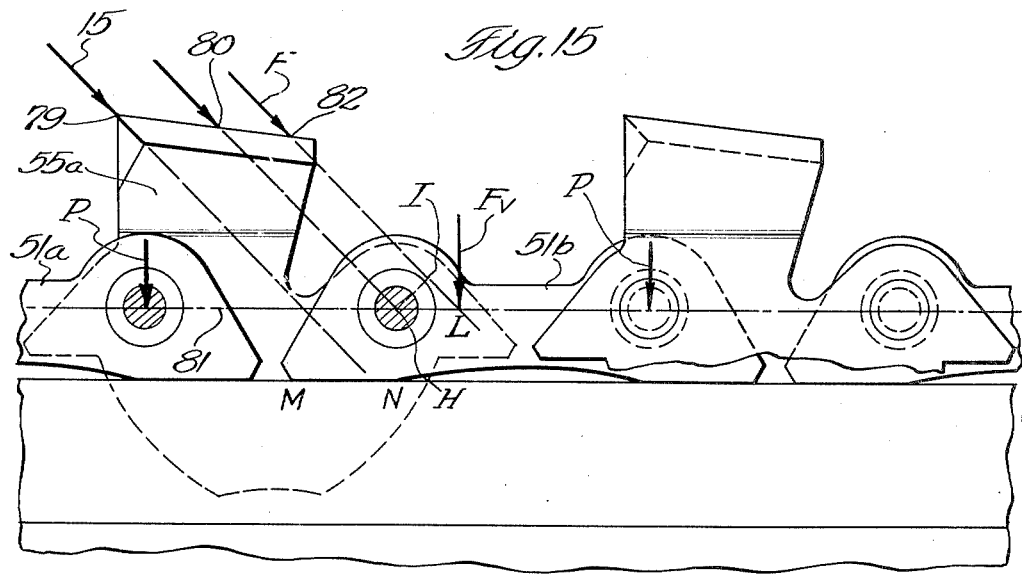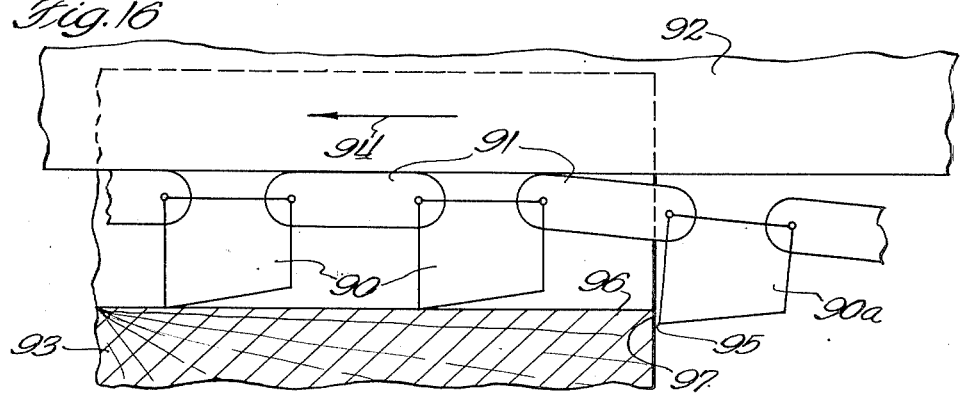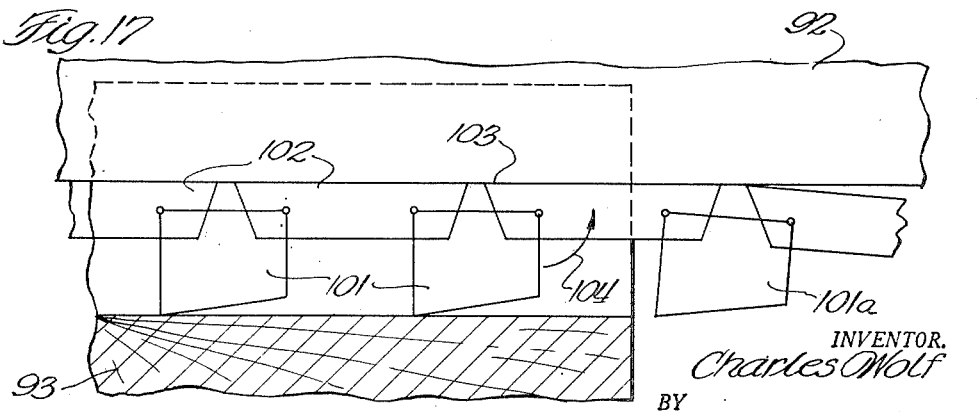

April 5, 1955    C. WOLF    2,705,512
SAW CHAIN
Filed Jan. 3, 1950    4 Sheets-Sheet 4
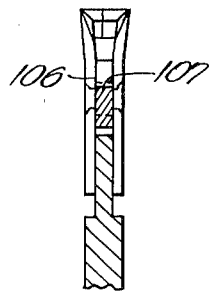
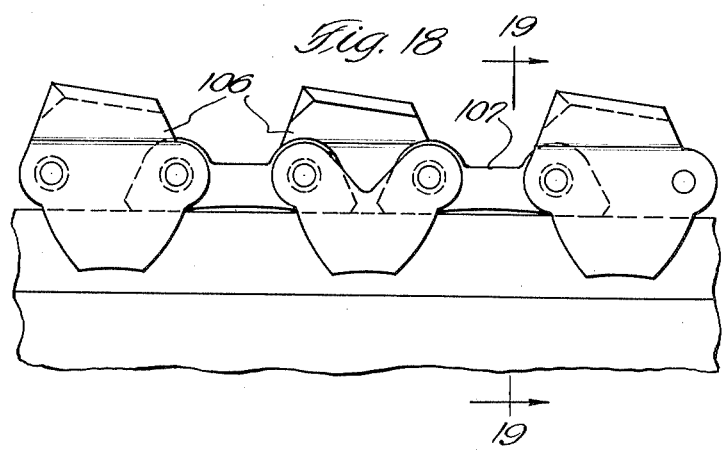
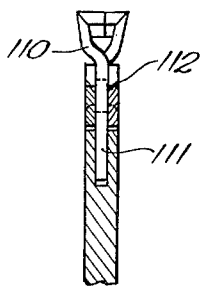
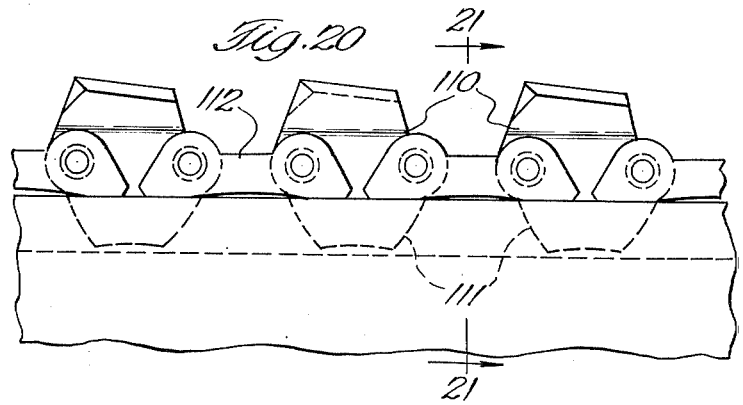
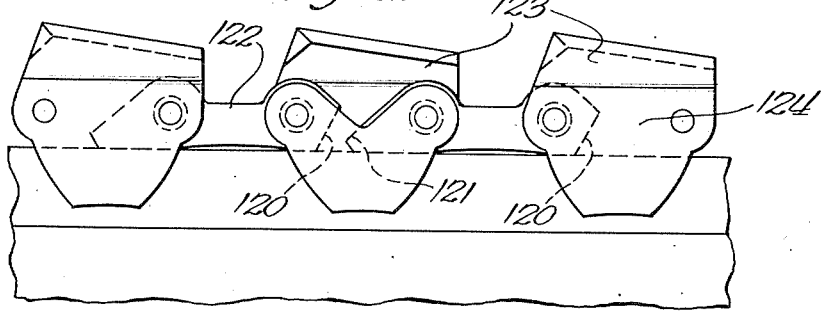
INVENTOR.
Charles Wolf
BY
Buckhorn and Cheatham
ATTORNEYS

United States Patent Office 2,705,512
Patented Apr. 5, 1955

2,705,512

SAW CHAIN

Charles Wolf, Portland, Oreg., assignor to Jerome L. Wolf, Portland, Oreg.

Application January 3, 1950, Serial No. 136,636

2 Claims. (Cl. 143—135)

The present invention relates to saw chains and more particularly to linkage structures for providing greater stability for the cutter teeth during sawing operation.

This application is a continuation-in-part of my co-pending application Serial No. 664,547, filed April 24, 1946, entitled Saw Chain, now abandoned.

Saw chains of certain types now in common use are inherently relatively unstable with the result that depth gauges, drag teeth, or equivalent means are usually provided for facilitating cutting operation. Saw chains which rely upon depth gauges to counter effect the instability of the cutter links are inherently inefficient in operation and vibrate excessively. I have discovered that, with proper design of the base portions of the saw chain links riding upon the saw bar edge, complete stability of the cutter links may be obtained making possible the elimination of depth gauges, drag teeth or the like means with many other ancillary advantages. The cost of manufacture of the chain is materially lowered, a greater number of cutting teeth may be provided in a given length of chain, the effective life of the cutting teeth may be prolonged, while the operation of the saw is further characterized by smoothness and complete absence of jerking, a truer and more accurate cut and with less fatigue to the operator.

More specifically, the objects stated above are accomplished in the present invention by the provision of alternate kerf cutter links and blocks pivotally connected together with only the teeth of the cutter links adapted for engaging the bottom of the kerf. The cutter links are pivotally supported at opposite ends upon the adjacent ends of the intervening blocks, and only the lower edge surfaces of the blocks are adapted for riding upon the saw bar edge. The blocks are each provided with forward extensions which ride upon the saw bar edge ahead of the leading pivot. By reason of these forward extensions on the blocks connecting adjacent cutter links the downward component of force exerted upon each cutter link is transmitted through the connecting block to the forward end of the next following cutter link in such a manner as to provide complete stability for the saw chain with other resultant advantages some of which have been referred to above.

For a consideration of what is believed novel and inventive attention is directed to the following description taken in connection with the accompanying drawing, while the features of novelty will be pointed out with greater particularity in the claims annexed hereto.

In the drawings:

Figs. 1, 2 and 3 are explanatory diagrams illustrating certain fundamental considerations pertinent with respect to the present invention; Fig. 4 is a side elevation illustrating a chain saw tooth of the prior art; Fig. 5 is an end view of the structure shown in Fig. 4; Fig. 6 is a side elevation illustrating a chain saw tooth of the prior art in a different form than that shown in Fig. 4; Fig. 7 is a side elevation showing the tooth of Fig. 6 in a cutting position with relation to a workpiece; Fig. 8 is a fragmentary side elevation illustrating a chain saw constructed in accordance with one modification of the present invention; Fig. 9 is a plan view of the chain saw shown in Fig. 8; Fig. 10 is an enlarged sectional view taken along the line 10—10 of Fig. 8; Fig. 11 is a view in perspective showing a tooth element incorporated in the chain saw of Figs. 8 and 10; Fig. 12 is a view in perspective illustrating a detailed part of one of the cutter lengths of the chain saw of the present invention; Fig. 13 is a view in perspective illustrating one of the blocks incorporated in the chain saw illustrated in Fig. 8; Fig. 14 is a view in perspective illustrating a further modification of a chain saw block; Fig. 15 is an enlarged fragmentary view of a part of the chain saw illustrated in Fig. 8; Fig. 16 is a diagrammatic view illustrating certain features of operation in connection with chain saws of the prior art; Fig. 17 is a diagrammatic view illustrating certain features of operation of the chain saw of the present invention and as illustrated in Fig. 8; Fig. 18 is a side elevation illustrating a section of a chain saw constructed in accordance with a further modification of the present invention; Fig. 19 is a sectional view taken along the lines 19—19 of Fig. 18; Figs. 20 and 21 are side elevational and end views, respectively, of a section of a chain saw constructed in accordance with a still further modification of the present invention; and Fig. 22 is a further side elevational view of a section of a chain saw illustrating a further modification of the present invention.

For a more complete understanding of the principles underlying the present invention certain fundamentals regarding stability in a saw chain will first be discussed with reference to diagrammatic Figs. 1, 2 and 3. The apices A, D, and E represent the cutting tips while the points B and C represent the pivot supporting pins. The actual configuration of the entire cutter link is unimportant for the moment. The effective base lengths B and C of the three teeth are all the same but their heights are different. It is assumed that the teeth are moved in the direction from right to left as indicated by the arrow 13 with their tips in engagement with a work piece. With a given pressure exerted between the saw bar, represented by the base lines, and the work piece, in a direction normal to the base lines and with a certain forward propelling force it may be assumed that the resultant force exerted by the work piece upon the teeth and opposing forward movement of the teeth, may be represented by the angular vector 15. The vector 15 is the algebraic sum of the force vector 16 extending at right angles to the saw bar and the horizontal vector 17 extending parallel with the line of the saw bar. It may be assumed that the force vectors 16 and 17 are equal and which has been determined empirically as being substantially true in a normal wood sawing operation, and in which case the angle of the resultant force 15 is 45 degrees with respect to the base lines B—C.

Considering first the tooth 10 of Fig. 1, it will be obvious that because of the fact that the line of the applied resultant force 15 intersects the base line to the right of the point C, the tooth 10 will be unstable and will tend to pivot about the point C under the influence of the force 15, irrespective of the magnitude thereof.

Referring now to the tooth 11 shown in Fig. 2, the pitch thereof, represented by the distance BC, is the same as that of the tooth 10 but the height of the tooth or the distance DB is less than the distance AB of the tooth 10 or the same as the distance BC. Now with the same force 15 applied to the tooth 11 it will be observed that the line of direction of the force coincides with the line DC so that the tooth 11 will be stable though critically so. That is, with any slight increase in the horizontal component of the force vector 15 with respect to the vertical component the tooth 11 will be unstable in that it will tend to pivot about point C as in the case of tooth 10.

Considering now the tooth shown in Fig. 3, the length of the base BC is the same as that of the teeth 10 and 11 but the height EB is still further reduced. Now under the same force 15 it will be observed that the line of direction of such force intersects the base line between the points B and C so that the tooth 12 will be stable and throughout a considerable variation in the proportionate relationships of the horizontal and vertical components of the resultant force vector 15. The purpose of this preliminary discussion is merely to illustrate what is meant by the terms "stability" and "instability" as those terms are used in the instant disclosure.

In Figs. 4 and 5 is shown a particular type of chain saw tooth 19 of the prior art commonly referred to as a chisel bit type tooth comprising a side plate having a laterally offset tooth shank portion 20 and a right angularly extending toe portion 21, the toe portion being provided with a beveled cutting edge at the forward end thereof. As the tooth becomes worn it may be reconditioned by filing and, obviously, with each filing of the tooth the cutting edge recedes progressively rearwardly of the link. The ratio of the distance between the axes of the pivot pins 22 and 23 to the effective tooth height or the distance between the axis of pin 22 and the forward tip of the tooth 24, corresponds to distances BC and EB of Fig. 3. When the tooth is new and with a resultant force acting thereupon as indicated by the force vector 15, the tooth will be stable for reasons as previously pointed out, inasmuch as the line of the force 15 intersects the effective base line of the tooth link between the pivot points 22 and 23. This tooth will remain stable until the cutting edge is filed back to the point 25 which is the limit point for stability for this particular tooth. As the cutting edge of the tooth is filed back further, beyond the point 25, to some such point as 26, the direction of the applied force 15 will intersect the base line of the tooth rearwardly of the pivot point 23 with the result that the tooth will be rendered unstable. In other words, the effective or stable life of the tooth is limited by the length of time required for the tooth to wear or be filed back to the point 25.

Referring now to Fig. 6, there is illustrated a cutter tooth link 30 and which is similar to that illustrated in Figs. 4 and 5 except that it is provided with a depth gauge 31 at the forward end thereof, and which is typical of many saw chains now in common use.

This tooth link 30 is inherently unstable for the reason that provision of the depth gauge on the forward end of the link has shifted the cutting edge so far rearwardly the line of the normal operating force 15 intersects the effective base line 32 rearwardly of the rear pivot pin 33. This condition of instability remains true throughout the entire range of normal operating variations between the relative proportions of the horizontal and vertical components of the force 15. Referring particularly to Fig. 7, it will be observed that as the cutting edge bites into the bottom of the kerf indicated by the line 34 the tooth will tend to rotate about the rear pivot pin 33 in the direction indicated by the arrow 35. Such rotation is limited, however, by engagement of the depth gauge 31 against the bottom of the kerf ahead of the cutting edge. Such operation of a chain saw is inefficient for the reason that frictional engagement of the depth gauge 31 with the bottom of the kerf results in a very substantial loss of power, and excessive wear takes place at point 40. The operation of the saw is very jerky and accompanied by excessive vibration which imposes severe strains upon the entire machine and upon the operator as well, due to the fact the forward pull on the cutter link, represented by force vector 36, tends periodically to jerk the cutting edge of the tooth out of the wood and to snap the raised rear end portion 37 of the connecting link 38 downwardly against the saw bar 39.

Referring now to Figs. 8 to 14, inclusive, a chain saw constructed in accordance with my present invention will be described. My chain saw consists of a plurality of cutter links 50 and alternate blocks 51 pivotally connected together at uniformly spaced points extending longitudinally of the chain by means of pins 52. As illustrated more clearly in the enlarged view of Figs. 11 and 12, the cutter links each consist of a pair of plate members 55 and 56 secured to opposite sides of the connecting blocks 51. The blocks 51 are provided with relatively large openings 57 at opposite ends for cooperatively receiving the enlarged central portions 58 of the pivot pins 52. In the assembly of the chain, the side plate members 55 and 56 are positioned over the relatively small diameter opposite end portions of the pins 52 after which the ends of the pins are riveted over in the cooperating countersunk holes in the side plate members as shown in Fig. 10. The thickness of the blocks 51 is slightly less than the width of the central bearing portion 58 of the rivet pins so that the blocks 51 will pivot freely about the pins. One of the side plate members, such as member 55, is provided with a cutter tooth defining portion including a laterally offset shank portion 59 and a toe portion 60 extending at right angles back over the upper surface of the block 51, as viewed in Fig. 10. The leading edge of the shank and toe portions 59, 60 are beveled to form a cutting edge 61 thereon as shown. Alternate right and left cutter teeth are provided on alternate cutter link assemblies of the saw chain. Both of the side plate members 55 and 56 are provided with depending flange portions 65 and 66, respectively, and which are adapted to extend on each of the opposite sides of the saw bar track portion 67 of the saw bar 68 as shown in Fig. 10 for guiding the movement of the chain saw therealong. The present invention is not concerned with any particular configuration of the tooth provided on the cutter link, but primarily with the blocks 51.

Referring to Figs. 8 and 13 it will be observed that the upper edge of the blocks 51, or the edge surface adjacent the teeth 60, is spaced very substantially below the teeth so that no portion of the blocks engages with the bottom of the kerf. Furthermore, only the lower edges of the blocks 51, or the edge surfaces opposite the teeth, are adapted for riding upon the edge of the saw bar 67. Particular attention is directed to the fact that the block 51 is extended on opposite ends considerably beyond the pin openings 57, and as will be pointed out more fully hereinafter, the forward extension 70 is particularly important to the present invention. The central portion of the lower edge surface of the block is concavely curved, as indicated at 71, while the opposite end portions are coplanar as shown at 72 and 73 providing large flat bearing surfaces with long wear life for riding upon the edge of the saw bar. The intermediate portion 71 is curved to provide a cooperative bearing surface for the curved outer surface of the sprocket teeth 74 (see Fig. 8). In this regard, it will be observed that the lower edge portions of the cutter link members 55 and 56 are also concavely curved at 75 to provide bearing surfaces to ride cooperatively upon the surface of the sprocket hub 76.

The block modification shown in Fig. 14 differs from that of Fig. 13 in that a forwardly facing vertical surface 77 is formed thereon for facilitating removal of sawdust from the kerf.

Referring now to the enlarged fragmentary view of Fig. 15, it will be observed that in the case of new teeth, the line of the resultant force 15 acting at point 79 intersects the effective base line 81, extending through the centers of the pivot pins, ahead of the rear pivot of the cutter link so that the teeth will be stable during sawing operation. When the cutting edges are filed back to some point such as 80, the line of the applied force passes through the center of the rear pivot and which corresponds to the limit of stability for the cutter links of the prior art. In accordance with the present invention, however, the teeth may be filed back still farther to some such point as 82 and the cutter links will still retain stability during sawing operation. Stability of the cutter links in the latter condition is accomplished by virtue of the forward extension of the interconnecting blocks 51 and which forward extensions serve as lever arms whereby the downward force exerted upon the block by the cutter link tends to urge the trailing end of the block downward toward the saw bar. This in turn tends to hold the forward end of the next following cutter link also in its lowermost position adjacent the saw bar.

With further reference to Fig. 15 it will be observed that with a force F applied at the point 82 of the cutter link, a turning moment is created about the pivot point H and which may be expressed as:

$$F \times HI$$

in which F is the resultant force of a load applied to the cutter link and HI the right angular distance between the line of the force F and the point H. This moment may also be expressed by its equivalent:

$$F_v \times HL$$

in which $F_v$ is the vertical component of the force F and HL the distance between the pivot point H and the point of intersection of the line of force F and the effective base line 81 of the cutter links extending through the various pivot points. It may be proven mathematically that so long as the length of the forward extension of the block, or the distance MN is at least as great as the distance HL, then the downward force P acting upon the forward pivot of the next following cutter link will be sufficient to hold the front end of such next following cutter link at the lowermost position and thus counterbalance the turning moment $F_v \times HL$. Because of the fact that in use all teeth are filed back by similar amounts, it may be properly assumed that the turning moment is substantially the same simultaneously on all teeth and thus the downward force exerted upon each block is effective for stabilizing the next following cutter link. In the types of chain saws here considered, the distance HL will always be very substantially less than the spacing between adjacent pivot pins for the reason that, as shown in the drawings, the cutter teeth extend above the pivot pins to a height very little, if any, greater than the distance between the pivot pins, and preferably less.

It will be seen that, in accordance with my present invention, no depth gauge, lock arrangement or any other equivalent means is required for assuring a semblance of stability and successful cutting operation. Each cutter link automatically regulates the maximum depth of the cut for each following tooth. Only cutting edges engage with the bottom wall of the kerf, and no portions of the chain drag with frictional resistance in the cut without performing useful work. Since each tooth rides smoothly and firmly in engagement with the saw bar at all times chattering of the cutter links during sawing operation, with attendant vibration, is completely eliminated.

Another feature of the present invention may be illustrated with reference to Figs. 16 and 17. In Fig. 16 is shown diagrammatically a saw chain of the prior art comprising cutter links 90 and interconnecting blocks 91, the saw chain being mounted upon a saw bar 92. The saw chain is shown making a cut through a piece of timber 93 in the direction indicated by the arrow 94. As is well known in the art, the saw chain is thrown outwardly by centrifugal force from the saw bar 92 prior to the time that the chain links enter the cut as shown at the right. The cutter link 90a is shown approaching the cut and it will be observed that the end thereof at the leading edge 95 is considerably below the bottom of the kerf indicated at 96. As the tip 95 strikes the edge 97 of the timber, the cutter link 90a is thrown with a sharp blow upwardly against the saw bar. The impact of each cutter link against the kerf edge and the subsequent blow of the cutter link against the saw bar gives rise to a very serious condition of vibration and imposes severe strains not only upon the chain itself but upon all parts of the machine.

In Fig. 17 is shown diagrammatically a comparative view similar to Fig. 16 but illustrating a saw chain of the present invention comprising cutter links 101 and interconnecting blocks 102, each of the blocks being provided with forward extensions as indicated at 103. Now, as soon as one of the cutter links 101 enters the kerf and the cutting edge thereof engages the kerf bottom a resultant force is transmitted through the cutter link to the rear pivot pin tending to rotate the block about the leading tip 103 thereof in the direction indicated by the arrow 104. The forward end of the next following cutter link 101a is thereby lifted to a position next adjacent the saw bar prior to the time that it actually enters the kerf so that it is automatically aligned therewith. The cutter link 101a thus enters the kerf smoothly and without impact against the forward edge of the timber as previously described in connection with Fig. 16.

As previously mentioned, the present invention is not concerned with any particular tooth configuration on the cutter links. In Figs. 18 and 19 is illustrated a saw chain similar to that shown in Figs. 8 to 13 except that a slightly different configuration of teeth 106 is provided upon the cutter links. The blocks 107 interconnecting the alternate cutter links are identical to the blocks 51 as previously described.

Attention is also directed to the fact that the present invention is not to be limited to chains for use with straddle type saw bars as illustrated in Figs. 8 and 10. The saw chain of the present invention may equally well be adapted for use with grooved types of saw bars as is illustrated in Figs. 20 and 21. As shown in the latter figures the cutter links 110 are arranged in the central plane of the chain and are provided with root portions 111 which depend within the saw bar groove. The block units 112 arranged between the alternate cutter links 110 each consist of a pair of similar elements riveted to the opposite sides of the intermediate cutter links. Each of the block elements is similar to the blocks 51 as previously described and ride upon the upper edges of the saw bar on opposite sides of the central groove.

In the foregoing description primary emphasis was placed upon the forward extensions 72 of the blocks 51 as described in detail in connection with Fig. 13. The saw chain of the present invention depends upon these extensions from the leading ends of the blocks for providing stability to the cutter links during sawing operation especially when the cutting edges are filed back. Similar extensions are provided on the rear ends of the blocks in order that relatively large bearing surfaces may be provided for riding upon the edge of the saw bar. By virtue of these large bearing surfaces the load of the respective cutter links is distributed over large areas on the saw bar and wear is materially reduced both on the saw bar as well as upon the chain blocks. Also, in case reversible types of cutter teeth are provided upon the cutter links enabling operation of the saw in either direction of travel then the rearward extensions as shown provided upon the interconnecting blocks become forward extensions effective for stabilizing the cutter links in the manner as previously described.

In the preferred embodiments of the invention the length of the end extensions of the chain blocks is shown as amounting substantially to one-half the pitch length, or in other words, one-half the distance between adjacent pivot pins. It will be observed that these extensions may be decreased or even increased, should increased stabilizing effect be desired. In the case of unidirectional chain saws, for example, the leading end of the block may be lengthened with a corresponding reduction in the length of the rearward extension. As shown, for example, in Fig. 22 the rear end 120 of the blocks 122 are cut off and the leading end 121 is correspondingly lengthened so as to provide an increased degree of stability. This enables lengthening of the cutter teeth rearwardly in the longitudinal direction of the saw as shown by the lengthened upper portion 123 of the teeth 124. Stability will obtain, as previously pointed out, so long as the length of the forward extension is at least as great as the distance between the rear pivot pin of the cutter link and the point of intersection between the line through the pivot centers and the line of the resultant force applied to the cutter tooth during sawing operation.

In the following claims, wherever mention is made to the end extensions of the chain block elements, applicant refers only to the end portions shown, for example, in Fig. 15 and which effectively engage with the saw bar beyond the pivot pins H, such as from point N to point M.

Having described the invention in what are considered to be certain preferred embodiments thereof, it is desired that it be understood that the specific details may be varied considerably without departing from the true spirit and scope of the invention.

I claim:

1. A saw chain consisting of a plurality of alternate kerf cutter links and blocks pivotally connected together at points uniformly spaced longitudinally of the saw chain, only said blocks being adapted for sliding upon the outer edge of a cooperating saw bar, said cutter links each having a cutting tooth defining portion extending outwardly from one longitudinal edge thereof and defining a cutting edge extending transversely of the chain, the longitudinal edge surface of said blocks adjacent said cutting tooth defining portion being wholly spaced substantially below the line of travel of said portion whereby no portion of said blocks engages the bottom of the kerf during cutting operation of the saw, the forward end portion of each of said blocks extending forwardly of the pivotal connection with the cutter link arranged ahead thereof by a substantial distance, the tooth portion of the link ahead of the forward pivot of any one of said blocks being spaced substantially entirely forwardly of a line inclined forwardly at an angle of substantially 45 degrees with respect to a longitudinal line through the pivots of said one block and intersecting said longitudinal line rearwardly of said forward pivot a distance substantially equal to the length of said forward extension, the surface of said blocks opposite the tooth defining portion of said cutter links and including said forward extension being provided with coplanar flat surface portions adapted for riding upon the edge of a cooperating saw bar, whereby upon engagement of the tooth defining portion with the bottom of a kerf the downward component of force exerted through the rear pivot of the cutter link upon the block urges the rear end of the block toward the saw bar and the forward end portion of the next following cutter link toward its lowermost position adjacent the saw bar.

2. A saw chain consisting of a plurality of alternating kerf cutter links and blocks pivotally connected together at points uniformly spaced longitudinally of the saw chain, only said blocks being adapted for sliding upon the outer edge of a cooperating saw bar, said cutter links each having an elongate cutting tooth defining portion extending outwardly from one longitudinal edge thereof and defining a laterally extending cutting edge on the forward end thereof, said tooth portion being adapted to be reconditioned a plurality of times whereby said cutting edge recedes progressively rearwardly of said link, the longitudinal edge surface of each of said blocks adjacent said tooth portions being wholly spaced substantially below the line of travel of said tooth portions whereby no portion of said blocks engages the bottom of the kerf during cutting operation of the saw, the forward end portion of each of said blocks extending forwardly of the pivotal connection with the cutter link arranged immediately ahead thereof, the length of said forward extension being at least as great as the distance rearwardly of the forward pivot of said block to the point of intersection between a line through both pivots of said block and a line sloping forwardly at a 45 degree angle and intersecting the rearmost part of the tooth portion of the link immediately ahead of said block, the edge surface of said blocks opposite said tooth portions and including said forward extensions being provided with flat surface portions adapted for riding upon the edge of a cooperating saw bar.

References Cited in the file of this patent
UNITED STATES PATENTS

| | | |
|---|---|---|
| 1,642,145 | Ferguson | Sept. 13, 1927 |
| 2,308,847 | Wolf | Jan. 19, 1943 |
| 2,356,437 | Smith | Aug. 22, 1944 |
| 2,435,892 | Mall | Feb. 10, 1948 |
| 2,508,784 | Cox | May 23, 1950 |
| 2,515,550 | Ciba | July 18, 1950 |
| 2,564,989 | Ohman | Aug. 21, 1951 |